(12) United States Patent
Reusche et al.

(10) Patent No.: US 8,336,496 B2
(45) Date of Patent: Dec. 25, 2012

(54) SYSTEM AND METHOD FOR HEATING A POULTRY WATERING DEVICE

(75) Inventors: Thomas K. Reusche, Elburn, IL (US); Phillip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 13/442,234

(22) Filed: Apr. 9, 2012

(65) Prior Publication Data
US 2012/0192797 A1 Aug. 2, 2012

Related U.S. Application Data

(62) Division of application No. 12/695,344, filed on Jan. 28, 2010, now Pat. No. 8,176,874.

(60) Provisional application No. 61/153,378, filed on Feb. 18, 2009.

(51) Int. Cl.
*A01K 7/00* (2006.01)
*A01K 39/00* (2006.01)
(52) U.S. Cl. .......................................... 119/73; 119/74
(58) Field of Classification Search ............... 119/73, 119/74, 72, 72.5, 52.01, 51.12, 51.5, 52.1, 119/58, 61.5, 61.52; 220/592.01, 592.16, 220/592.17; 222/146.1, 146.2; 219/441, 219/438; 392/444, 445, 441; D30/132
See application file for complete search history.

(56) References Cited

U.S. PATENT DOCUMENTS

| | | |
|---|---|---|
| 405,369 A | 6/1889 | Merriman |
| 769,942 A | 9/1904 | Elsold |
| 1,073,195 A | 9/1913 | Weller |
| 1,343,010 A | 6/1920 | Schell |
| 1,358,245 A | 11/1920 | Pruden |
| 1,438,770 A | 12/1922 | Long |
| 1,458,450 A | 6/1923 | Unger |
| 1,557,502 A | 10/1925 | Ryon |
| 1,643,245 A | 9/1927 | Jevons |
| 1,673,814 A | 6/1928 | Edington |
| 1,787,015 A | 12/1930 | Mueller |
| 1,828,048 A | 10/1931 | Jevons |
| 1,881,838 A | 10/1932 | Mohr |
| 2,530,597 A | 11/1950 | Opal |
| 2,671,430 A | 3/1954 | Miller |
| 2,687,115 A | 8/1954 | Andrews |
| 3,170,439 A | 2/1965 | Juenger |
| 3,221,706 A | 12/1965 | Johnson |
| 3,292,580 A | 12/1966 | Merritt |
| 3,384,109 A | 5/1968 | Stroburg |
| 4,293,964 A | 10/1981 | Riedel |
| 5,682,836 A | 11/1997 | Gustin |
| 5,711,248 A | 1/1998 | Boyd |
| 7,735,455 B2 | 6/2010 | Clark |
| 7,861,671 B2 | 1/2011 | Carter et al. |
| 8,011,324 B1 | 9/2011 | Warganich |
| 8,146,535 B1 | 4/2012 | Neumann |
| 2007/0277738 A1 | 12/2007 | Dentsbler |
| 2008/0245308 A1 | 10/2008 | Clark |

*Primary Examiner* — T. Nguyen
(74) *Attorney, Agent, or Firm* — Joseph M. Butscher; The Small Patent Law Group, LLC

(57) ABSTRACT

Certain embodiments of the present invention provide a watering system configured to provide water to livestock. The system includes a water basin defining a trough configured to retain water, a reservoir mounted to the water basin, wherein the reservoir is configured to receive and retain water above the water basin. A water path is defined from the reservoir to the trough, wherein water within the reservoir is configured to pass into the water basin through gravity. A first heating element configured to heat water within the reservoir. A second heating element is configured to heat water within the trough, wherein the second heating element is separate and distinct from the first heating element.

6 Claims, 2 Drawing Sheets

SYSTEM AND METHOD FOR HEATING A POULTRY WATERING DEVICE

RELATED APPLICATIONS

The present application is a division of U.S. application Ser. No. 12/695,344, entitled "System and Method for Heating a Poultry Watering Device," filed Jan. 28, 2010, which relates to and claims priority from U.S. Provisional Application No. 61/153,378, entitled "Heated Poultry Waterer," filed Feb. 18, 2009, both of which are hereby incorporated by reference in their entireties.

FIELD OF THE INVENTION

Embodiments of the present invention generally relate to a system and method for providing water to livestock, such as poultry, and more particularly, to a system and method for heating water within a watering device.

BACKGROUND OF THE INVENTION

Gravity-feed watering devices have been used for a number of years in order to provide water for livestock, such as chickens, to drink. In general, the watering device includes a basin having a low wall that defines a drinking trough. A metal or plastic water reservoir is mounted above the basin. Typically, the reservoir has a fluid capacity of one to five gallons.

In use, the reservoir is positioned on the basin such that an open end is downwardly-oriented, akin to a bucket that is turned upside down. In order to fill the watering device, the reservoir is detached from the basin. The reservoir is then inverted so that its open end is exposed. Water may then be filled into the reservoir, which then retains the water. After the reservoir is filled, the basin is reattached to the reservoir, and the device is tipped over, such that the basin is upwardly-oriented and the reservoir is downwardly-oriented. In this orientation, the outer circumferential wall of the basin overhangs the reservoir, as the diameter of the basin exceeds that of the reservoir.

FIG. 1 illustrates a cross-sectional view of a conventional watering device 10. The device 10 includes a basin 12 having base 14 integrally formed with an outer wall 16 defining a water-retaining volume therebetween. The device 10 also includes a reservoir 18 having a base 20 integrally formed with circumferential walls 22. An open end of the reservoir leads to a cavity 24 configured to receive and retain water 26.

As shown in FIG. 1, the device 10 is in an operational configuration such that the reservoir 18 is attached to the basin 12. A drinking trough 28 is defined between the outer wall 16 and the edges of the walls 22.

A channel or notch may be formed proximate the edge of walls 22 of the reservoir 18. The channel allows water to flow by force of gravity from the reservoir 18 into the trough 28. As water flows out of the reservoir 18, it is replaced by air that bubbles past the edge and collects in an air pocket above the water 26 contained within the reservoir 18.

The water 26 inside the reservoir 18 flows into the drinking trough 28 until the water level in the trough 28 rises above the lower edge 30 of the reservoir 18. Accordingly, air is prevented from entering the reservoir 18 to take the place of the water 26. At this point, a vacuum forms above the surface of the water 26 within the reservoir, and ambient air pressure quickly balances the water and air pressure inside the reservoir 18, thereby preventing additional water 26 from flowing into the trough 28.

Watering devices, such as the device 10, are often used outdoors or in unheated buildings, such as chicken coops. In these settings, air temperature may drop below freezing. In order to prevent ice from forming in the watering devices, some individuals opt to employ high wattage light bulbs above the watering devices. Alternatively, or additionally, heated metal bases may be used to heat the water. However, the use of light bulbs may prove very inefficient and ineffective, and heated bases typically cannot be used with plastic watering devices, as such could melt or otherwise damage the plastic.

United States Patent Application Publication No. 2008/0245308, entitled "Heated Poultry Fountain," filed Apr. 9, 2007 (the "Clark application"), discloses a system that incorporates a heating element into the basin. The heating element covers the underside of the basin and is disposed along an inner wall of the drinking trough. The Clark application recognizes that water in the drinking trough will lose heat much faster than the water within the reservoir due to its smaller volume and direct exposure to ambient air. Accordingly, the Clark application devotes at least 40% of the heating element to heating the trough in order to have a higher wattage per volume of water in that volume. Thus, whenever the heating element is activated, water within the trough is heated to a higher temperature.

In a system such as disclosed in the Clark application, however, the thermostat that controls the power supplied to the heating element is positioned to monitor the temperature of the reservoir. Because the mass of water in the reservoir may be 30-50 times greater than the mass of water in the drinking trough, and the water in the reservoir is insulated to a certain degree, while the water in the trough is not, the rate of heat loss for water in the trough may be several orders of magnitude greater than for that in the reservoir. Hence, water in the trough cools much quicker than water within the reservoir.

For example, suppose the thermostat is set to activate when the water temperature reaches 4° C. Typical thermostats exhibit a hysteresis of around 10° C., so it is safe to assume that the water in the reservoir may have been initially 14° C. or higher. Assuming that the water in the drinking trough is heated to a much higher temperature because of the higher wattage per unit water volume around the trough, the water temperature in the trough may be as high as 40° C.

The rate of heat loss is given be the following equation:

$$Q = mc\Delta/\Delta t$$

where Q is the rate of heat loss, m is the mass of the water, c is the specific heat of water, $\Delta T$ is the change in temperature, and $\Delta t$ is the length of time.

Assuming a best-case condition in which the rate of heat loss for water within the reservoir and the trough is the same, the equations for the reservoir and the trough may be set to equal one another:

$$Q_1 = Q_2$$

$$m_1 c \Delta T_1 / \Delta t = m_2 c \Delta T_2 / \Delta t$$

Using a one gallon reservoir as an example, the mass of the water in the reservoir may typically be around 10 times the mass of the water in the drinking trough. That is, $m_1 = 10 m_2$. Thus, $$10 m_2 c \Delta T_1 / \Delta t = m_2 c \Delta T_2 / \Delta t$$

$$\Delta T_2 / \Delta t = 10 \Delta T_1 / \Delta t$$

Therefore, in best-case conditions, when the rate of heat loss is the same for both the reservoir and the drinking trough, the rate of temperature change for the water in the drinking trough will be 10 times faster than for the water in the reservoir. Accordingly, the water in the reservoir may cool to 10° C., while the water in the trough is already freezing.

In actual conditions, however, the rate of heat loss for water in the drinking trough is typically much higher than that within the reservoir, so the discrepancy noted above is exacerbated. To compensate, the set point of the thermostat is typically much higher (for example, 16° C.). Then, while the water in the reservoir varies from 16° C. to 26° C., the water in the drinking trough varies from 0° C. to 40° C. Maintenance of water temperature at such an artificially high temperature is inefficient and costly.

Additionally, the higher temperature to which the water is heated increases the rate of evaporation. Therefore, the reservoir typically needs to be refilled frequently. Moreover, hotter water is less desirable for drinking, even by livestock.

If the thermostat is moved from the reservoir to the trough, the heating element may shut off too soon before enough heat is delivered to the reservoir. As a result, water within the reservoir may freeze and possibly cracker the reservoir.

SUMMARY OF THE INVENTION

Certain embodiments of the present invention provide a watering system configured to provide water to livestock. The system includes a water basin, a reservoir, and first and second heating elements.

The water basin defines a trough configured to retain water. The reservoir is mounted to the water basin. The reservoir is configured to receive and retain water above the water basin. A water path is defined from the reservoir to the trough. Water within the reservoir is configured to pass into the water basin through gravity.

The first heating element is configured to heat water within the reservoir. The second heating element is configured to heat water within the trough. The second heating element is separate and distinct from the first heating element.

The system may also include a first temperature sensor, such as a thermostat or thermistor, configured to sense the temperature of one or both of at least a portion of the reservoir and/or water within the reservoir. The first temperature sensor is configured to selectively activate and deactivate the first heating element based on the sensed temperature.

The system may also include a second temperature sensor, such as a thermostat or thermistor, configured to sense the temperature of one or both of at least a portion of the trough and/or water within the trough. The second temperature sensor is configured to selectively activate and deactivate the second heating element based on the sensed temperature.

The first heating element may be located underneath an open end of the reservoir. The second heating element may be located on a wall defining an inner boundary of the trough.

The system may also include a processing unit in communication with the first and second heating elements. The processing unit selectively activates and deactivates the first and second heating elements based on detected water temperatures.

Certain embodiments of the present invention provide a method of heating water within a gravity-feed poultry watering device. The method includes detecting the temperature of water within a water reservoir of the poultry watering device with a first temperature sensor, selectively activating and deactivating a first heating element proximate at least a portion of the water reservoir based on the detected temperature of the water within the water reservoir, detecting the temperature of water within a drinking trough connected to the water reservoir through a fluid path with a second temperature sensor, and selectively activating and deactivating a second heating element proximate at least a portion of the drinking trough based on the detected temperature of the water within the drinking trough.

The selectively activating and deactivating the first heating element may be based on a first temperature set-point. The selectively activating and deactivating the second heating element may be based on a second temperature set-point that differs from the first temperature set-point.

DETAILED DESCRIPTION OF THE INVENTION

Figure 2:
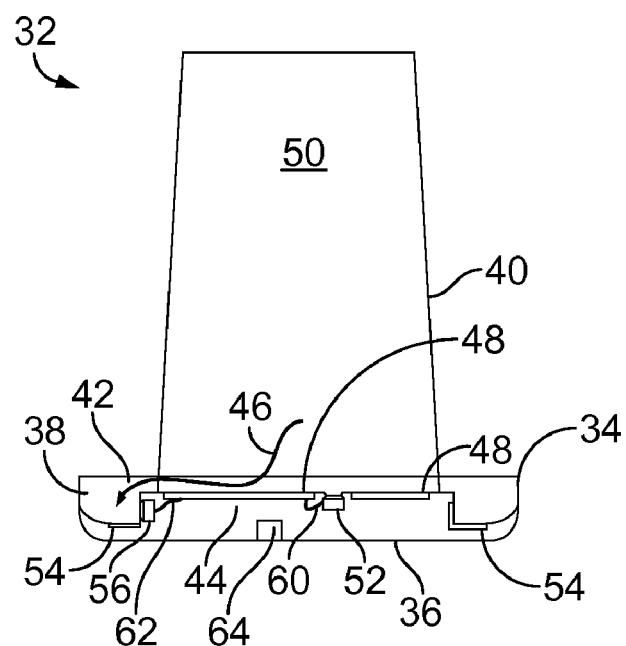
FIG. 2 illustrates a cross-sectional view of a watering device, according to an embodiment of the present invention.

FIG. 2 illustrates a cross-sectional view of a watering system 32, according to an embodiment of the present invention. The system 32 includes a basin 34 having a base 36 integrally formed with an upstanding circumferential wall 38. A reservoir 40 is positioned over the basin 34, and is configured to allow water to pass into an annular drinking trough 42 defined by the wall 38 and an interior island 44 of the basin 34.

Figure 1:
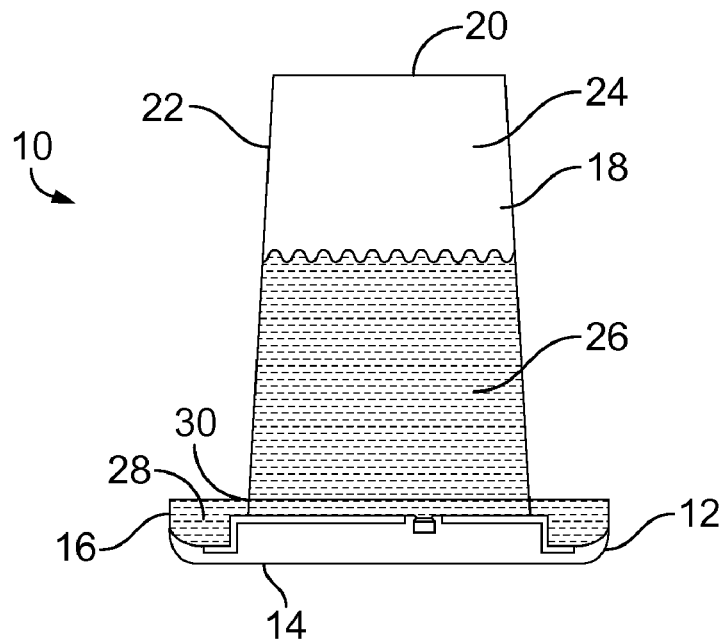
FIG. 1 illustrates a cross-sectional view of a conventional watering device.

As shown in FIG. 1, the island 44 is lower than upper edges of the wall 38. Accordingly, a fluid path 46 is defined from the interior of the reservoir 40, over the island 44, and into the drinking trough 42.

At least one heating element 48 is secured above or below the upper surface of the island 44 and directed toward the interior chamber 50 of the reservoir 50. The heating element 48 is configured to heat water within the interior chamber 50. The heating element 48 may be a disk-shaped heating element that covers, or is underneath, a top surface of the island 44. The heating element 48 is electrically connected to a temperature sensor 52.

Additionally, at least one heating element 54 is secured on or underneath the island 44 proximate the trough 42. The heating element 54 is configured to heat water within the trough 42. The heating element 54 may be an annular-shaped heating element that tracks an inner wall of the basin that defines an inner boundary of the trough 42. The heating element 54 is electrically connected to a temperature sensor 56.

The sensor 56 is disposed proximate the inner wall of the island 44. Optionally, the sensor 56 may be located proximate the bottom surface of the trough 42. It has been found that placement of the sensor 56 in these locations provides exceptional sensing response.

The wattage of the heating element 54 may differ from that of the heating element 48. Thus, the system 32 may enable differential heating of water at different locations. That is, water within the trough 42 may be heated to a first temperature, while water within the reservoir 40 may be heated to a second temperature that differs from the first temperature.

As shown, embodiments of the present invention provide a system 32 including two separate heating elements 48 and 54. The heating element 48 provides heat to water within the interior chamber 50 of the reservoir 40, while the heating element 54 provides heat to water within the trough 42. Each heating element 48 and 54 is independently controlled by a separate and distinct temperature sensor 52 and 56, respectively.

The heating element 48 may be electrically connected to the temperature sensor 52 through a switch 60. Similarly, the heating element 54 may be electrically connected to the temperature sensor 56 through a switch 62. The switches 60 and 62 allow the temperature sensors 52 and 56, respectively, to selectively activate and deactivate the heating elements 48 and 54, respectively, based on set-points of the sensors 52 and 56.

Each heating element 48 and 54 is independently controlled by its respective thermostat 52 and 56 and the switches 60 and 62 to form a heating circuit. The two separate and distinct heating circuits can be wired in parallel to a single power source (not shown).

In certain embodiments, the sensors 52, 56, and switches 60 and 62, respectively, combine to form bimetal thermostats that are used as control devices for each heating element 48 and 54, respectively. In such a configuration, each thermostat is in thermal contact with the outer surfaces of the island 44. For plastic basins, a metal insert or screw that passes through the basin 34 may be employed to increase the thermal conductivity between the reservoir water and the thermostat, if desired.

The sensors 52 and 56 may be mechanical, such as bimetal thermostats, or electronic, such as thermistors. The switches 60 and 62 may be mechanical contacts, such as found in a thermostat, or a triac and/or a relay.

Additional heating elements with their own respective controlling devices may be added in parallel. For example, a small heating element may be desired to cover a tube leading from the reservoir to the drinking trough or to a detached drinking tough.

The temperature sensors 52 and 56 and heating elements 48 and 54 may be affixed directly to the underside of the basin 34 (such as an upwardly-indented portion that defines the island 44). Alternatively, the sensors 52 and 56 and the heating elements 48 and 54 may be detachably secured to mounting brackets that attach to the basin 34.

The power supplied to the heating elements 48 and 54 may be alternating or direct current, and may be supplied through a single electrical cord leading to a power source, such that the heating circuits are wired in parallel. Optionally, power to each heating circuit may be routed from separate and distinct power sources.

Optionally, a processing unit 64 may be positioned on or within the basin 34. The processing unit 64 may be in electrical communication with the heating elements 48 and 54 and the sensors 52 and 56. The processing unit 64 may be programmed to control operation of the heating elements 48 and 54 based on detected water temperatures. That is, the processing unit 64 may activate and deactivate the heating elements 48 and 54 based on temperature readings that are relayed to the processing unit 64 through the sensors 52 and 56. In this embodiment, the sensors 52 and 56 may be thermometers that detect the temperature of water and/or surface temperatures of the basin 34 at the locations of the sensors 52 and 56.

Figure 3:
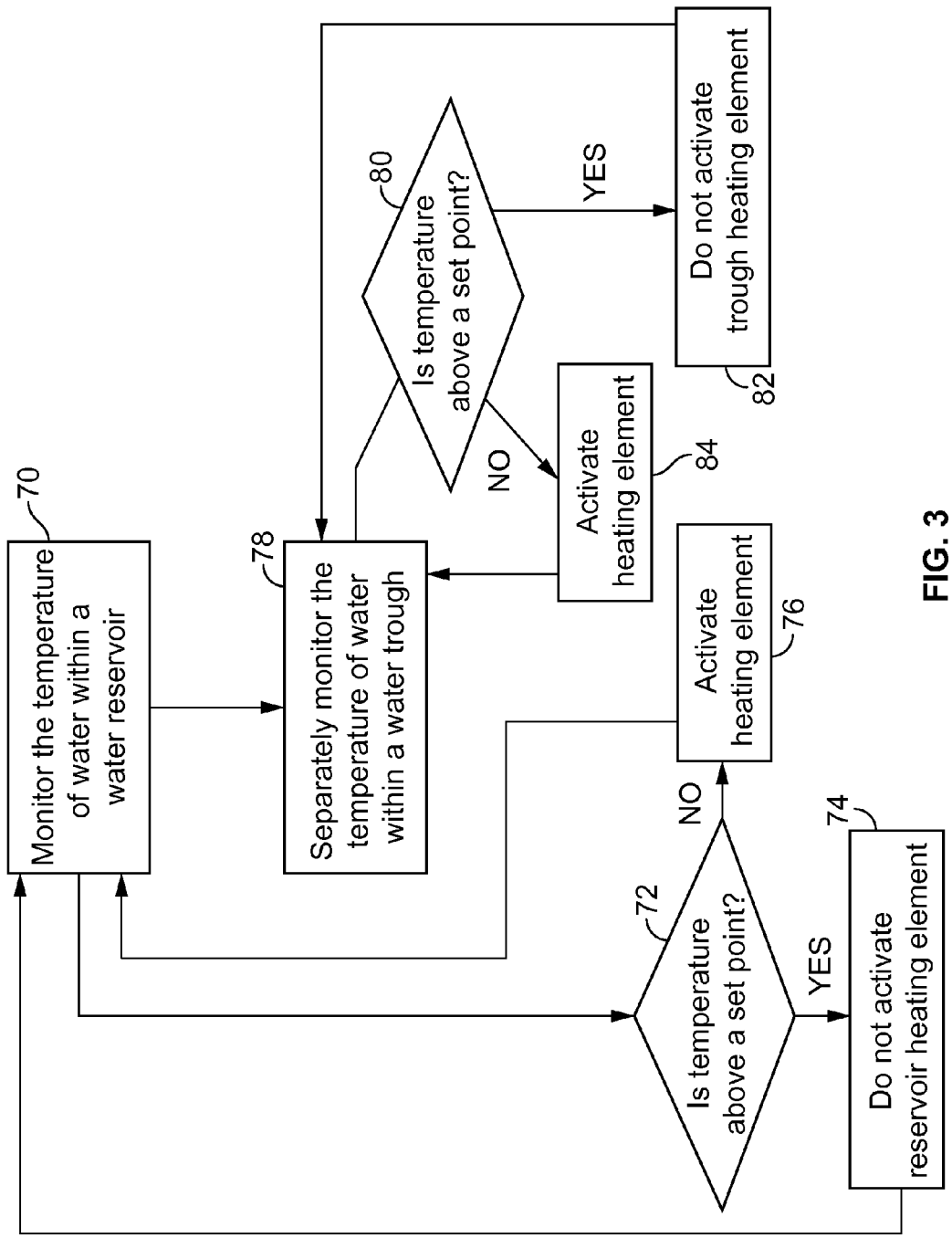
FIG. 3 illustrates a flow chart of a method of operating a watering device, according to an embodiment of the present invention.

FIG. 3 illustrates a flow chart of a method of operating a watering device, according to an embodiment of the present invention. At 70, temperature within a water reservoir is monitored, as described above. At 72, a temperature sensing circuit determines whether the water within the reservoir is above a temperature set-point. If the temperature exceeds the set point, the heating element is not activated at 74, and the process returns to 70. If, however, the temperature is below the set-point, the heating element is activated at 76 to heat the water within the reservoir, and the process returns to 70.

Additionally, at 78, the temperature of the water within the drinking trough is monitored with a separate and distinct sensing circuit, which determines at 80 whether the water within the trough is above a temperature set-point. At 82, if the temperature of the water within the trough is above the set-point, the separate and distinct trough water heating element is not activated, and the process returns to 78. If, however, the trough water temperature is below the set-point, at 84, the separate and distinct trough water heating element is activated, and the process returns to 78.

Embodiments of the present invention may be used in conjunction with the systems and methods shown and described in U.S. application Ser. No. 12/695,769, filed Jan. 28, 2010, entitled "System and Method for Automatically Deactivating a Poultry Watering Device," assigned to Allied Precision Industries Inc., which is hereby incorporated by reference in its entirety.

Thus, embodiments of the present invention provide a system and method of efficiently heating water within a watering system. Because separate and distinct heating circuits are used to heat water within the trough and the reservoir, each heating circuit may be configured to heat water within each location to an ideal temperature that does not waste electricity.

While various spatial terms, such as upper, bottom, lower, mid, lateral, horizontal, vertical, and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method of heating water within a gravity-feed poultry watering device, the method comprising:
   detecting temperature of water within a water reservoir having an interior chamber with a first temperature sensor;
   selectively activating and deactivating a first heating element that is secured to a first surface of a water reservoir and directed toward the interior chamber based on the detected temperature of the water within the water reservoir;
   detecting temperature of water within a drinking trough connected to the water reservoir through a fluid path with a second temperature sensor; and
   selectively activating and deactivating a second heating element secured to a second surface of a water reservoir that defines at least a portion of the drinking trough based on the detected temperature of the water within the drinking trough.

2. The method of claim 1, wherein each of the first and second temperature sensors comprises a thermostat.

3. The method of claim 1, wherein each of the first and second temperature sensors comprises a thermistor.

4. The method of claim 1, further comprising using a processing unit to control the selective activation and deactivation of the first and second heating elements.

5. The method of claim 1, wherein the selectively activating and deactivating the first heating element is based on a first temperature set-point, and wherein the selectively activating and deactivating the second heating element is based on a second temperature set-point that differs from the first temperature set-point.

6. A method of heating water within a gravity-feed poultry watering device, the method comprising:
   detecting temperature of water within a water basin having an interior chamber with a first temperature sensor;
   using a processing unit to selectively activate and deactivate a first heating element that is secured to a first surface of a water basin and directed toward the interior chamber based on a first temperature set-point of the water within the water basin;
   detecting temperature of water within a trough connected to the reservoir through a fluid path with a second temperature sensor; and
   using the processing unit to selectively activate and deactivate a second heating element secured to a second surface of a water basin that defines at least a portion of the trough based on a second temperature set-point of the water within the trough, wherein the first and second temperature set-points are different.

\* \* \* \* \*